March 16, 1965 L. C. RAYMOND 3,173,398
ELEVATED PET LOUNGE
Filed April 9, 1963

INVENTOR.
Lloyd C. Raymond
BY Snow and Benno
Attys.

3,173,398
ELEVATED PET LOUNGE
Lloyd C. Raymond, 273 Exmoor, Glen Ellyn, Ill.
Filed Apr. 9, 1963, Ser. No. 271,755
2 Claims. (Cl. 119—1)

This invention relates to a new and improved elevated pet lounge.

The raising of pets such as dogs or cats in modern dwelling establishments and particularly apartment buildings or hotels is extremely difficult. When dogs were kept on farms they were usually permitted to roam the yard and surrounding countryside. They were able to familiarize themselves with the various sounds and odors or other strange occurrences by investigating the sources of these events. As a rule the farm dogs were not given the run of the farm house. However, in some instances when they were permitted in the house they were usually also permitted the opportunity to get out on their own when they desired. In our present urban communities dogs and cats must be generally restricted in their movements by their owners because of local ordinances which require pets to be on leashes and never be permitted to run loose. As a result, dog owners, and there are many of them, are required to keep their dogs in their homes during periods of time when they are away. Many apartment house dwellers keep pets and in many instances the dogs are left alone from a time early in the morning to a time late in the afternoon or evening. It is usually during these times of loneliness that fears build up in pets. They fear the many noises of the outside they cannot see. They fear people and vehicles both near and far, and because they are not able to see the source of these noises or events, they develop great anxieties. It is at these times that dogs and especially young dogs tend to chew or scratch at furniture, rugs or other furnishings not because of meanness or an attempt to be destructive but usually because of great frustration caused by their "caged in" feeling and a desire to get at the unknown and unseen intruder. The present invention is primarily for the purpose of eliminating these tensions and anxieties in household pets who are required to stay inside during long periods of time.

The principal object of this invention is to provide an elevated lounge for dogs and cats or the like which is placed adjacent a window through which the pet can easily see many of the occurrences creating outside noises and enjoy watching outside activities.

An important object of this invention is the provision of easy access means for a pet to an elevated lounge.

Another important object of this invention is to supply a portable lounge for pets which may be easily moved from place to place within a house or apartment and which will generally appear as another piece of furniture in the room in which it is situated.

A still further important object of this invention is to equip an elevated lounge for household pets with an angularly adjustable ramp leading from the floor to the elevated lounge and permitting the pet easy access to the lounge.

Another and still further important object of this invention is to provide a portable elevated pet lounge and ramp therefor which may be folded into compact relationship and locked in closed position for easy portability.

Another and still further important object of this invention is the provision of a portable pet lounge having a suitable luggage type handle for conveniently moving the lounge from place to place.

Still another important object of this invention is to provide a pet lounge having means for resting on a window sill so that the pet may have a view of the exterior in which he is positioned and including an adjustable ramp means at the other side of the lounge to support the lounge at a position spaced from the window sill and simultaneously to provide access means for the pet from the floor of the building enclosure to the lounge resting on the window sill.

Still another and further important object of this invention is to generally equip a pet appliance which includes a ramp and an elevated station from which the pet may have unobstructed viewing ability and providing the ramp with a friction producing surface to enable the pet to easily climb to the elevated station and generally providing further that the station be equipped with cushion means to enable the pet to lounge in his elevated station.

Another important object of this invention is to provide a platform for pets with a hinge adjoined ramp leading to the platform and the ramp being hingedly adjustable with respect to the platform to enable the platform to be disposed at various heights or to fold the ramp beneath the platform for portability of the device in carrying it from one place to another.

An important object of this invention is to provide an elevated pet platform and an access ramp hinged thereto and including adjustable brace means to hold the ramp at any necessary angle to maintain the platform horizontally disposed at the selected height.

Another important object of this invention is the provision of locking means for holding the parts in folded relationship for easy portability within a room, to another floor or in any vehicle.

Still another important object of this invention is to provide a pet holding device from which the pet may enjoy watching outside activities and avoid a "shut-in" feeling which could bring on frustrations.

Another object is to provide an elevated resting place for household animals where they will be out of floor drafts and will get some exercise in reaching the elevated station.

Other and further important objects and advantages will become apparent from the disclosures in the following specification and accompanying drawings.

Figure 1:
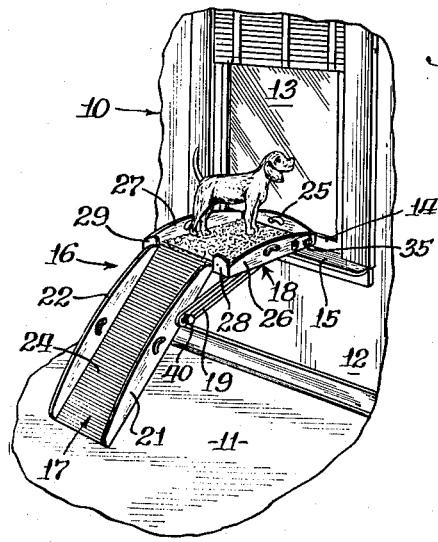
FIGURE 1 is a perspective view of the elevated pet lounge of this invention shown in operation adjacent a house window.

The reference numeral 10 indicates generally a portion of the interior of a house and more particularly a living room of that house or apartment. The room constituting the portion 10 of the living quarters of a home is provided with a floor 11, a wall 12, and a window 13. The window 13 includes a generally rectangular frame 14 and an interior window sill 15 at the bottom thereof. It is on this sill and adjacent this window that the elevated pet lounge of this invention is to be used. It should, of course, be understood that the lounge may be arranged relative to any window having a sill of any height because of the adjustable nature of the ramp leading to the lounge all as will be subsequently described. Also, it should be made clear that the platform of lounge may be supported or any object such as a table or other pieces of furniture of varying heights.

The entire elevated pet lounge of this invention is shown generally at 16. The device includes an inclined ramp 17, a lounge deck 18, and adjustable brace members 19 and 20. The brace members extend from the sides of the ramp to the underside of the lounge deck. It is preferable that the pet device of this invention be made as a finished piece of furniture which will complement any home furnishings and in fact be of itself decorative so as not to detract from interior decorations. The ramp 17 is provided with spaced apart side walls or rails which flank an intermediate floor 23 on which the pet can walk or run up to his elevated deck lounge 18. The floor of the ramp is preferably provided with a covering mat 24 having a corrugated top surface with generally transversely disposed ribs to provide friction sufficient to permit the pet to climb to his lounge deck easily regardless of the angle of inclination of the ramp relative to the deck.

The lounge deck or platform 18 is provided with an end wall 25 which in use is disposed adjacent the window 13. The platform is also provided with spaced apart side walls 26 and 27 which adjoin the ends of the end wall 25 and project forwardly toward the ramp 17. The front of the deck 18 is equipped with short length walls 28 and 29 which join the forward ends of the walls 26 and 27 and project inwardly toward each other to a position closely adjacent the sides 21 and 22 of the inclined ramp 17. There is thus provided a space between the inner ends of the short length walls 28 and 29 through which a pet may pass from the ramp to the deck without any obstruction. The lounge deck 18 is equipped with a floor 30 and preferably a foam rubber filled type of cushion 31 on which the dog may comfortably rest or sit. It should, of course, be understood that the cushion means on the deck or the corrugated rubber mat on the inclined ramp may be changed as desired. For example, the same carpeting on the floor of the room in which the elevated pet lounge of this invention is to be used may be applied to the ramp and to the deck so that the device truly becomes a part of the living room decor.

Figure 2:
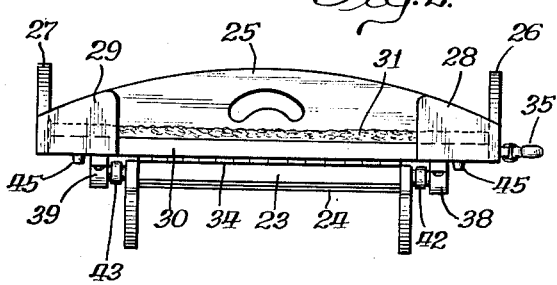
FIGURE 2 is an end view of the pet lounge of this invention in folded portable position and more particularly as taken on the line 2—2 of FIGURE 4.
Figure 3:
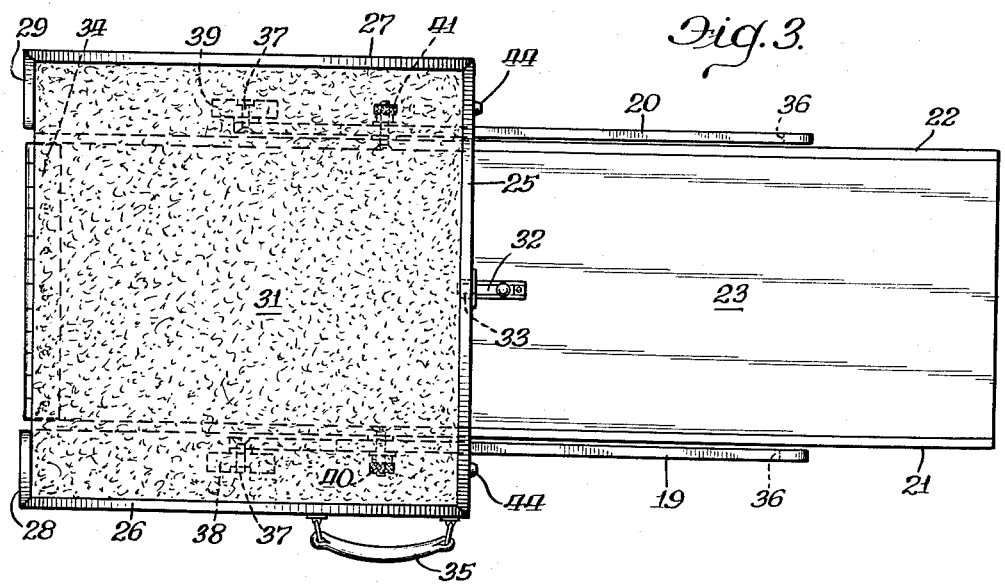
FIGURE 3 is a plan view of the pet lounge of this invention folded for portability and showing the top of the lounge portion and the bottom of the ramp portion folded thereagainst.
Figure 4:
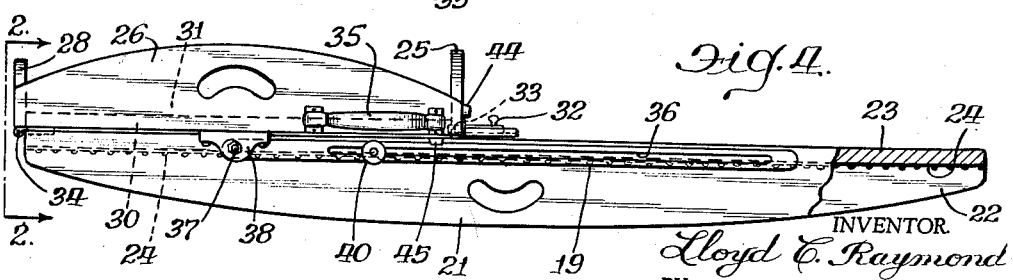
FIGURE 4 is a side elevational view of the device as shown in FIGURE 3.

The pet lounge of this invention is exceptionally attractive because of its versatility both as to its position within the room, its adaptability to match existing furniture, and its portability. In moving the device from one location to another and this is intended to include and does include the movement from one building to another and even the taking of the device on trips for it may be used in motels or hotels or even in the home of a place the pet owner may be visiting. A slide lock 32 is provided on the underside of the ramp 17. The slide lock is adapted to engage a recess 33 in the lower edge of the deck 18 at the end 25 thereof. The recess 33 is principally disposed in the bottom 30 of the lounge deck 18. When the device is shown in the position of FIGURES 3 and 4 the lock 32 is moved to a position engaging the recess 33 thus holding the ramp and deck in fixed relationship wherein one is on top of the other. A hinge 34 of the piano type joins the ramp 17 to the deck 18 along the lower forward edge thereof and generally disposed between the spaced apart endings of the short length walls 28 and 29. The hinge 34 thus provides for the arcuate swinging of the ramp 17 relative to the deck 18. In the position as shown in FIGURE 1 the ramp 17 is inclined at something less than 180 degrees with the deck 18 and similarly is inclined at some acute angle relative to the floor 11 of the room in which the device is situated. However, in FIGURES 2, 3, and 4, the ramp 17 is shown swung under the deck 18 so that the ramp might be considered to be disposed at a zero angle relative to the deck 18. In this position the device is arranged for portability and easy carrying thereof by reason of a handle 35 preferably made of a luggage type for ease of carrying. In any instance where the device is to be moved from one location to another and it is folded in the manner of FIGURES 3 and 4 it is preferable that the slide lock 32 be positioned to engage the recess 33 in the deck so that the parts are securely locked together during movement.

As best shown in FIGURES 1 and 4 the adjustable brace members 19 and 20 are provided with elongated slots 36. The inner ends of the brace members 19 and 20 are provided with hinge pins 37 which pass therethrough and engage downwardly depending brackets 38 and 39 which are mounted on the underside of the floor 30 of the lounge deck 18. Knurled or wing ended adjustable set screws 40 and 41 are provided for passing through the elongated slots 36 for engagement with cooperable nut means 42 and 43 mounted on the side walls 21 and 22 of the ramp 17. The knurled set screws 40 and 41 are preferably hand operated and permit the user to adjust the angular position of the ramp 17 relative to the deck 18 which in operating position is preferably horizontally disposed for easy resting of a pet thereon. Of course, the angular disposition of the ramp changes with the height of window sill 15 on which the deck is supported. In the position of the device as shown in FIGURE 1 the knurled set screws 40 and 41 are drawn up tightly so that the ramp is fixed relative to the deck and permits the pet to climb the ramp and attain his position in the lounge deck 18. Similarly in the folded or portable transport position of the device as shown in FIGURES 3 and 4 the knurled screws are again drawn up tightly so as to hold the adjustable brace members in a fixed position during such transporting of the device. In the folded or portable position the knurled set screws are disposed in the inner ends of the elongated slots 36 whereas in the device of FIGURE 1 the knurled ended set screws are disposed substantially at the outer ends of these elongated slots. It should, of course, be understood that the disposition of the knurled screws 40 and 41 will determine the inclination of the ramp 17 which in turn is determined by the height of the window sill 15 on which the pet lounge is carried.

As best shown in FIGURE 3 rubber or the like bumpers 44 are provided on the rear wall 25 of the lounge deck 18. These rubber bumpers are adapted to prevent scratching contact of the deck with the window frame 14 and in effect provide small spacer means between the deck and the window frame. Rubber pads 45 are provided on the underside of the floor 30 of the deck 18 at a position relatively close to the end wall 25. These pads are used to rest on the interior window sill 15 and provide a cushion for the lounge on the window sill.

In operation the device is carried by the handle 35 to any location desired and the more preferred locations are windows looking out to the exterior of the home so that the pets may view the major entrances of the home and thereby see who is approaching the house whether it be delivery men, service men, or members of the family. The pet, from his vantage point, at that window, can alleviate his fears and anxieties by knowing who is approaching the house and/or the source of noises occurring on the outside of the house. The lock 32 is slid outwardly from the recess 33 in the deck 18 and the knurled set screws 40 and 41 loosened so that the deck can be swung about the hinge 34 and placed with bottom pads 45 onto the window sill 15 and the rubber bumpers 44 moved against the window frame 14. The deck 18 is held in horizontal position while the knurled set screws 40 and 41 are re-tightened with the ramp 17 inclined at a position such as shown in FIGURE 1. The device is now ready for use by a pet. The pet, whether it be a dog or cat, may conveniently walk up the rubber corrugated floor of the ramp 17 and reach the cushioned deck 18 from which he may easily see through the window 13. Conversely when it is desired to move the device to another location whether in the same building or another building the knurled set screws 40 and 41 are loosened and the ramp 17 swung down to a position beneath the deck 18 and thereupon the slide lock 32 re-engaged with the recess 33 at which time the device may now be carried conveniently by the luggage type handle 34 to the selected new location.

The pet holding device may be used to aid in the basic training of a pet to sit, lay and stay. Also when guests are present the pet may occupy his lounge and be a member of the party without being objectionable to anyone.

I am aware that numerous details of construction may be varied throughout a wide range without departing from the principles disclosed herein and I therefore do not propose limiting the patent granted hereon otherwise than as necessitated by the appended claims.

What is claimed is:

1. A portable pet lounge comprising two substantially planar members, hinge means pivotally connecting said members together at one end of each thereof, said members further being formed to permit said members to be folded one against the other in a compact package arrangement, lock means for securing said members against relative pivotal movement in said compact package arrangement, handle means on one edge of one of said members for manual carrying of said compact package arrangement, said one of said members being further formed to serve as a pet retaining platform, said other of said members being further formed to serve as a ramp for a pet to said one member, pet retaining walls projecting outwardly from each of said members in the compact package arrangement, and said portable pet lounge including brace members folded in longitudinal alignment with and against the edges of the members in the compact package arrangement, and said brace members serving to secure said members in other pivotal relationships when said lock means is released.

2. A portable pet lounge comprising two substantially planar members, hinge means pivotally connecting said members together at one end of each thereof, said members further being formed to permit said members to be folded one against the other in a compact package arrangement, lock means for securing said members against relative pivotal movement in said compact package arrangement, handle means on one edge of one of said members for manual carrying of said compact package arrangement, said one of said members being further formed as a substantially square planar member to serve as a pet retaining platform, said other of said members being further formed to serve as a long planar ramp for a pet to said one member, and folded brace members disposed coplanar with the ramp and against both of said members in the compact package arrangement, and said brace members further being formed to hold said ramp and said platform in selected pivotal positions when said lock means is released.

References Cited by the Examiner
UNITED STATES PATENTS 2,045,931  6/36  Thacker et al. _____ 108—131
2,579,797  12/51  Churchfield et al. _____ 119—1

SAMUEL KOREN, *Primary Examiner.*

HUGH H. CHAMBLEE, *Examiner.*